Patented Feb. 8, 1927.

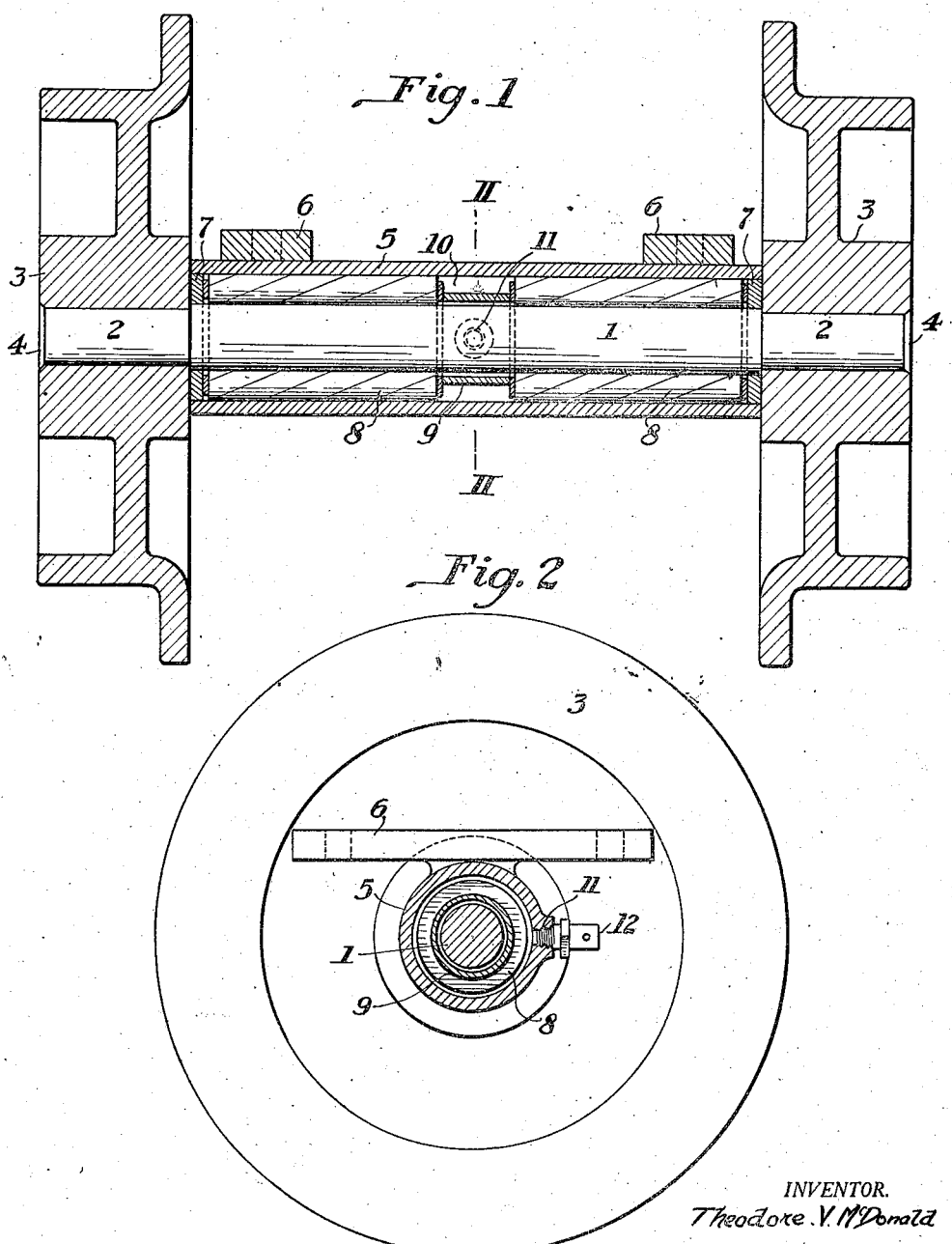

1,617,293

UNITED STATES PATENT OFFICE.

THEODORE V. McDONALD, OF DETROIT, MICHIGAN, ASSIGNOR TO EPWORTH MANUFACTURING COMPANY, OF DETROIT, MICHIGAN, A CORPORATION OF MICHIGAN.

AXLE AND BEARING ARRANGEMENT.

Application filed September 29, 1926. Serial No. 138,380.

This invention relates to axle and bearing arrangements, and is intended more particularly for use on vehicles having a pair of wheels connected by and mounted on a common axle. Certain classes of vehicles, such as industrial trucks, frequently have to travel through a considerable depth of water, mud and dirt which find their way into the bearings with the result that a considerably greater effort is required to move the trucks, and again the bearings quickly become worn and scored.

This invention aims to provide, among other things, an axle and bearing arrangement which will, to a very large extent, prevent foreign matter collecting on the axle and finding its way into the bearings.

Another object of the invention is to provide an axle and bearing arrangement which can be quickly and cheaply manufactured, and which may be readily secured to a truck body.

Having thus briefly outlined the major objects of the invention I will now proceed to describe an embodiment thereof with the aid of the accompanying drawings in which:

Figure 1 illustrates a sectional elevation of the invention, and

Figure 2 is a section on the line II—II of Figure 1.

Referring to the drawings, 1 designates an axle reduced at its ends 2 to receive wheels 3, which latter are usually pressed onto the axle ends and the latter then riveted over as indicated at 4, so that the wheels and axle all turn together.

Around the axle and extending the full width between the wheels is an annular housing 5 having brackets 6 welded, or otherwise secured, thereon to support the body of a vehicle (not shown). Substantially flush with the ends of the housing and secured thereto, usually by welding, are inward annular flanges which fit snugly around the axle so that the latter may turn freely therein. The outer surfaces of these flanges 7 bear against the inner surfaces of the wheels 1 as also do the ends of the housing 5.

Within the housing are two roller bearings 8 the outer ends of which latter rest against the inner surfaces of the flanges 7; and 9 indicates an annular spacer which holds the bearings in spaced relation to one another. The outside diameter of the spacer is usually materially less than the bore of the housing so that an oil reservoir 10 of sufficient size to contain a good supply of lubricant is formed between them. The bore of the spacer should be somewhat larger than the diameter of the axle around which it is arranged. An opening 11 is provided through the housing opposite the spacer so that when the plug 12 is removed lubricant may be poured into the reservoir.

It will be noted that the housing with its inward flanges forms an enclosed unit provided with end openings of just sufficient size for the axle to rotate freely, and that the flanges and the ends of the housing bear against the inner sides of the wheels so that the possibility of dirt and foreign matter entering the bearing has been reduced materially. Moreover the size of the oil reservoir is such that a sufficient amount of lubricant may be contained therein to last for a considerable time.

While in the foregoing a preferred embodiment of the invention has been described and shown, it is understood that the construction is susceptible to such modifications as fall within the scope of the appended claims.

What I claim is:

1. An arrangement of the character described comprising an axle having a wheel secured to each end, a housing of uniform internal diameter extending substantially the full distance between said wheels, supporting means on said housing, inward flanges on the outer ends of said housing having openings therethrough for the passage of said axle, bearings around said axle and within said housing one towards each end of the latter, and means for holding said bearings in spaced relation to one another.

2. An arrangement of the character described comprising an axle having a wheel secured to each end so that said wheels and axle rotate together, a housing around said axle extending substantially the full distance between said wheels, supporting means on said housing adapted to receive a vehicle body, inward flanges secured to the ends of said housing having passages therethrough which fit snugly around said axle, said flange outer surfaces being in close proximity to said wheels, bearings mounted around said axle within said housing, an annular spacer around said axle between said bearings, said spacer being materially smaller than the bore of said housing thereby forming an oil reservoir between said spacer and said housing bore, and means for filling said oil reservoir.

THEODORE V. McDONALD.